Figure 2:
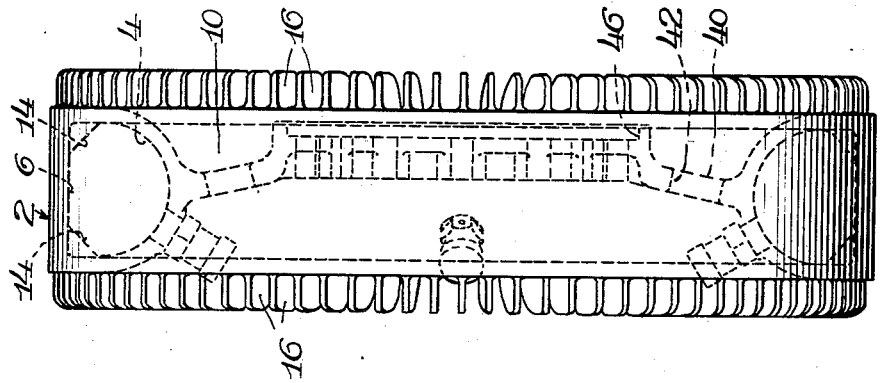

April 3, 1945.  R. C. PIERCE  2,372,984
BRAKE DISK
Filed Oct. 19, 1942  2 Sheets-Sheet 1

INVENTOR.
Raymond C. Pierce
BY
Orrin O. B. Garner
Atty.

April 3, 1945. R. C. PIERCE 2,372,984
BRAKE DISK
Filed Oct. 19, 1942 2 Sheets-Sheet 2

INVENTOR.
Raymond C. Pierce,
BY
Atty.

Patented Apr. 3, 1945

2,372,984

UNITED STATES PATENT OFFICE 2,372,984

BRAKE DISK

Raymond C. Pierce, Chicago, Ill.

Application October 19, 1942, Serial No. 462,481

7 Claims. (Cl. 188—264)

My invention relates to brake equipment and more particularly to a brake drum providing a friction surface for engagement with associated friction shoes in order to effect deceleration of a rotating member to which the drum is attached. My novel brake drum is particularly adapted to railway brake equipment, but it will be understood that the drum may be used for any purpose to which it is suited.

During recent years, there has been great interest in various forms of disk and drum brakes, especially in connection with railway equipment. An advantage of the drum over the disk type brake is that the former expands and contracts satisfactorily and with much less stress created by temperature changes. The principal disadvantage of the drum brake, however, and particularly the externally braked drum, is its inability to dissipate heat.

It is, therefore, an object of this invention to enable the use of otherwise desirable externally braked drums by making it possible to efficiently dissipate the heat generated. This is accomplished by casting or otherwise forming the brake drum with an internal pressure chamber capable of being vapor tight and except for the periphery where the brake shoes are applied, being provided with a plurality of external fins for increasing the heat dissipating surface of the drum. This pressure chamber is partially filled with a liquid which is urged against the internal periphery of the pressure chamber by centrifugal force during rotation of the associated wheel and axle assembly. When braking forces are applied, heat penetrates the brake drum, and thus the liquid therein is heated to the boiling point, whereupon the vapor generated passes across the pressure chamber and condenses on the side and inside walls of the pressure chamber which are externally provided with fins as above described. The condensate is then thrown outwardly by centrifugal force until it is again in contact with the inside surface of the periphery of the brake drum whereupon the action is repeated.

It will be understood that undesirably high pressure within the pressure chamber may be prevented by various means, such as selecting a suitable liquid having desired temperature, pressure characteristics, by limiting the amount of liquid introduced into the chamber, by dissolving various mixtures of salts in the liquid employed and by the utilization of safety valves.

It will be understood that the pressure chamber may, if desired, be divided into a plurality of chambers or may be designed as a single cavity. It will be further understood that in the event that the brake drum becomes heated to such a degree that all the liquid therein is maintained for a considerable period of time in a dry, superheated gaseous state, the vapor within the pressure chamber will continue to serve as a means of conducting heat from the braked surface of the drum to the side walls thereof whence it will be conducted into the fins above-mentioned and will be readily dissipated therefrom.

The conduction of heat from the braked surface of the drum by means of the vapor, as will be readily understood, is much more effective than that which would occur through metallic conduction to other parts of the drum.

As a further means of promoting air flow and heat transfer, the drum may, if desired, be designed as a centrifugal blower, however, it is believed that the utilization of a large number of fins increasing the heat transfer surface of the brake drum is just as effective in the present invention as would be the utilization of the fins as blower blades of a centrifugal blower especially when associated with a moving vehicle.

Figure 1:
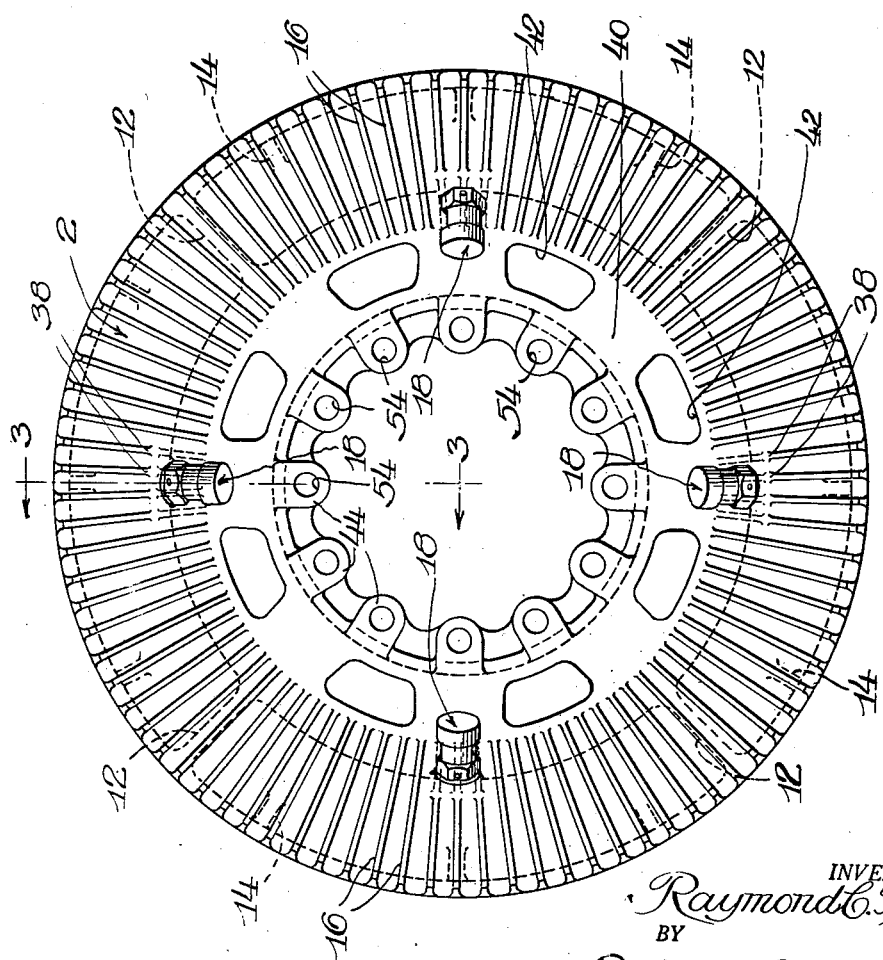
Figure 3:
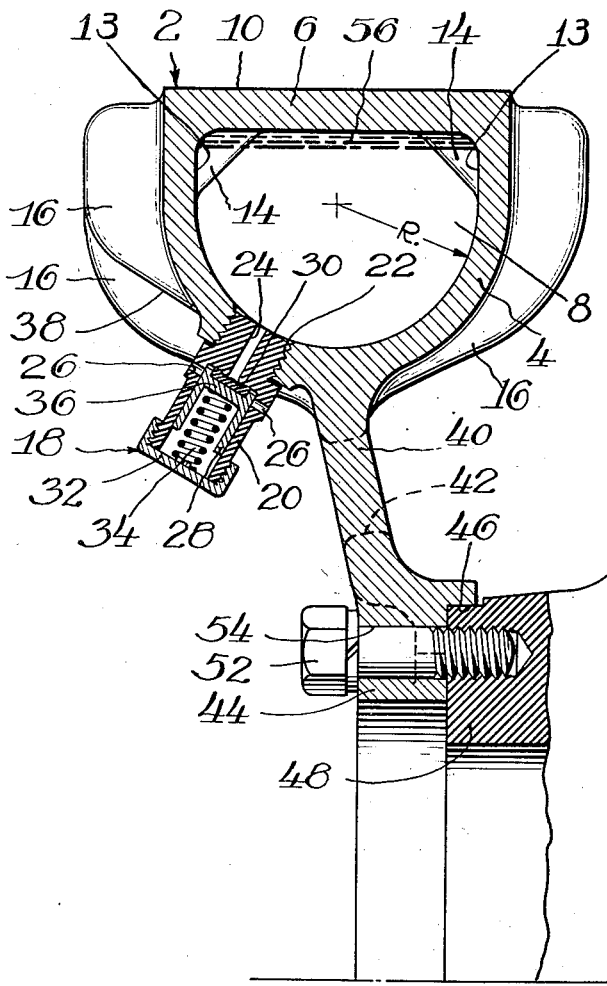

In the drawings, Figure 1 is a side elevation of my novel brake drum, Figure 2 is an edge elevation thereof taken from the right as seen in Figure 1, and Figure 3 is an enlarged sectional view taken substantially in the plane indicated by the line 3—3 of Figure 1 and illustrating my novel brake drum in conjunction with the rotating wheel of an associated wheel and axle assembly, the wheel being shown partly in section and partly in elevation.

Describing my invention in detail, the brake drum generally designated 2 comprises the annular U-section web 4 and the annular wall 6 integrally formed with the spaced legs of said U-section to define therewith a cavity or pressure chamber 8 (Figure 3), the wall 6 presenting on the outer surface thereof a braking surface 10 formed and arranged for engagement with an associated brake shoe or shoes. The pressure chamber 8 may be subdivided by the transverse radial webs 12, 12 into a plurality of identical chambers reinforced by the internal radial ribs 14, 14. It will be understood that, if desired, my rotor may be formed with a single pressure chamber or with as many chambers as desired. It will be understood from a consideration of Figure 3 that the inner surface of the web 4 is formed for the major portion of its width along a substantially constant radius as indicated at R, said surface being preferably formed with flat portions 13, 13 adjacent the juncture of the web 4 and the wall 2, said juncture being reinforced by means of the above-mentioned ribs 14, 14; and it will be apparent to those skilled in the art that this construction will afford equalized pressure against the web 4 by the vaporized fluid means within the chamber 8 and hereinafter more fully described. Externally disposed radial fins 16, 16 are formed about the inboard and outboard sides of the U-section web 4, the purpose of these fins being to increase the heat transfer surface of the drum and also to promote greater flow of air over the heated surfaces.

Each subdivision of the chamber 8 is provided with a safety valve generally designated 18, said valve comprising, as best seen in Figure 3, a body 20 threaded at 22 into the web 4 of the brake drum, said body being provided with a passage 24 communicating with the chamber 8 and said body also being formed with a plurality of passages 26, 26 communicating with the atmosphere externally of the chamber 8 and sealed by the piston-like sealing member 28 slidably positioned within the body 20, said sealing member being provided with a gasket 30 recessed therein and seated over the external end of the passage 24 in the closed position of the valve. A cap 32 is threaded on the body member 20 and a coil spring 34 is compressed between the cap 32 and a web 36 of the sealing member 28. It will be understood that the spring 34 may be of any predetermined strength and may be placed under any predetermined compression to resist outward movement of the sealing member 28 with respect to the body member 20. When, however, the pressure of the vapor within the chamber 8 reaches the danger point, it will force the sealing member 28 outwardly toward the cap 32 against the resistance of the spring 34 whereby the passages 24 and 26, 26 will be opened and the compressed vapor within the chamber 8 will be released until the pressure therewithin is lower than the danger point when the spring 34 will again urge the sealing member 28 into closed position. It will be apparent that any suitable safety valve having the desired operating characteristics may be substituted for that shown, if desired. It may be noted that the fins 16, 16 adjacent the valves 18, 18 are relieved as at 38 (Figures 1 and 3) to afford clearance therefrom.

Integrally formed with the web 4 is a disklike annular web 40 comprising the spaced openings 42, 42 therethrough, said openings serving to lighten the structure and to permit passage of air from one side of the drum to the other. The inner periphery of the web 40 is formed as a hub with a plurality of bosses 44, 44 therearound, and on the outboard surface thereof said hub is formed with a bore 46 for reception of a complementary hub portion 48 on the wheel and axle assembly indicated at 50 (Figure 3), the hub of the drum and the hub of the wheel and axle assembly being secured to each other by means of spaced bolts 52, 52 extending through openings 54, 54 in the hub of the drum, said openings being reinforced by the beforementioned bosses 44, 44.

Within the chamber 8 is a liquid designated 56 (Figure 3), said liquid serving as a cooling means and being of any desired chemical properties, as will be readily understood by those skilled in the art. For example, the vapor pressure of water, which may be used as the liquid 56, may be reduced by the use of various salts, and likewise various mixtures of salts dissolved in water may raise the boiling point thereof.

Thus it will be understood that I have designed a novel brake drum in which liquid cooling means may be maintained by centrifugal action against the inner surface of the braked web of the drum, as may be clearly seen in Figure 3 wherein the liquid 56 is illustrated as though the drum 2 and the wheel and axle assembly 50 were rotating in the customary manner. It will be further understood that upon vaporization of the liquid 56 the vapor may condense against the relatively cool U-section web 4, whereupon the condensate will again be urged radially outwardly by centrifugal force against the inner surface of the wall 6 as seen in Figure 3.

In the event that the over all temperature of the drum 2 becomes so high that the liquid 56 is entirely vaporized and the vapor becomes superheated, it will nevertheless be effective as a means of transferring heat from the relatively hot wall 6 of the drum to the relatively cool web 4 thereof, whence the heat will be conducted to the fins 16, 16. It will be readily understood that the transfer of heat from the wall 6 to the web 4 by means of the vapor is much more efficient than transfer of such heat by conduction through the wall 6 and the web 4.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake drum, a member comprising an annular substantially U-section web, the inner surface of said web being formed as a segment of a circle for the major portion of its width, an annular wall merging with spaced legs of said U-section to define therewith an annular pressure chamber, radial ribs formed within said chamber at the juncture of said wall with said web, liquid cooling means partially filling said chamber and adapted to be urged by centrifugal force during rotation of said drum against the inner periphery of said wall, said wall presenting a braking surface on the outer periphery thereof, a plurality of radial heat dissipating fins on the exterior surface of said web, and means for securing said drum to an associated rotating member.

2. In a brake drum, an annular web having spaced walls, an annular wall joining said spaced walls to define with said web a chamber for the reception of fluid cooling means, the inner surface of said web being formed in radial cross section as a segment of a circle for the major portion of its width, and means for attaching said drum to an associated rotating member.

3. In a brake drum, an annular member of U-section in radial cross-section and comprising spaced walls, an annular wall joining said spaced walls to define with said member a chamber for the reception of fluid cooling means, safety valve means for relieving excessive pressures within said chamber, and means for attaching said drum to an associated rotating member, the inner surface of said annular member being formed in radial cross-section as a segment of a circle for the major portion of its width.

4. In a brake drum, an annular web comprising spaced walls, an annular wall joining said spaced walls to define with said web a chamber for the reception of fluid cooling means, a plurality of transverse radial walls dividing said chamber into a plurality of spaced compartments, and means for attaching said drum to an associated rotating member, the inner surface of said annular web being formed in radial cross-section as a segment of a circle for the major portion of its width.

5. In a brake drum, an annular web having spaced walls, an annular wall joining said spaced walls to define with said web a chamber for the reception of fluid cooling means, and a hub member joining the inner perimeter of said web intermediate said spaced walls, said annular wall presenting an exterior braking surface, the inner surface of said web being formed in radial cross section as a segment of a circle for the major portion of its width.

6. In a brake drum, an annular member of U-section in radial cross-section and comprising spaced walls, an annular wall joining said spaced walls to define with said member a chamber for the reception of fluid cooling means, a plurality of transverse radial walls dividing said chamber into a plurality of spaced compartments, safety valve means for relieving excessive pressures within each compartment, and means for attaching said drum to an associated rotating member, the inner surface of said annular member being formed in radial cross-section as a segment of a circle for the major portion of its width.

7. In a brake drum, an annular web having spaced walls, an annular wall joining said spaced walls to define with said web a chamber for the reception of fluid cooling means, the inner surface of said web being formed in radial cross-section as a segment of a circle for the major portion of its width, a plurality of radial ribs within said chamber reinforcing the connection of said annular wall to each of said spaced walls, a hub member joining the inner perimeter of said annular web intermediate said spaced walls, and a plurality of radial heat dissipating fins reinforcing the connection of said annular web with said hub member.

RAYMOND C. PIERCE.